Feb. 27, 1945.   S. J. BEGUN   2,370,133
MEANS FOR AND METHOD OF TIMING

Filed April 2, 1942

INVENTOR.
SEMI JOSEPH BEGUN
BY Eber J. Hyde
ATTORNEY

Patented Feb. 27, 1945

2,370,133

UNITED STATES PATENT OFFICE 2,370,133

MEANS FOR AND METHOD OF TIMING

Semi Joseph Begun, Cleveland Heights, Ohio, assignor to The Brush Development Company, Cleveland, Ohio, a corporation of Ohio Application April 2, 1942, Serial No. 437,395

39 Claims. (Cl. 161—15)

This application is a continuation in part of my application Serial No. 425,304, entitled "Recording and reproducing device."

My invention pertains to timing devices, and more particularly to devices adapted to time short intervals with a high degree of accuracy.

An object of my invention is to provide an accurate short interval timing device.

Another object of my invention is to provide a small portable timing device.

A further object of my invention is to provide an accurate timing device wherein the degree of accuracy is constant even though the device is moved from place to place.

It is another object of my invention to provide a timing device the accuracy of which is independent of mechanical means.

Figure 1:
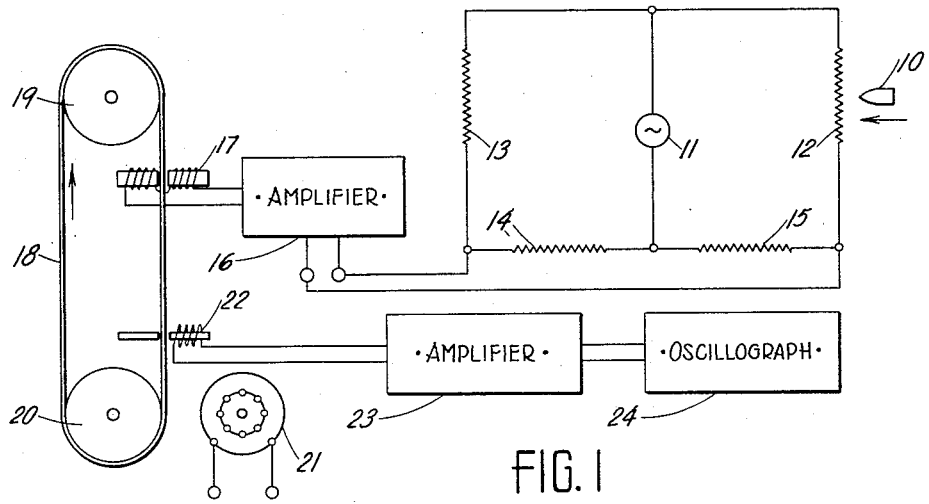

Other objects and a fuller understanding of my invention may be had by referring to the following specification and the accompanying drawing in which:

Figure 1 diagrammatically illustrates one form of my invention.

Figure 2:
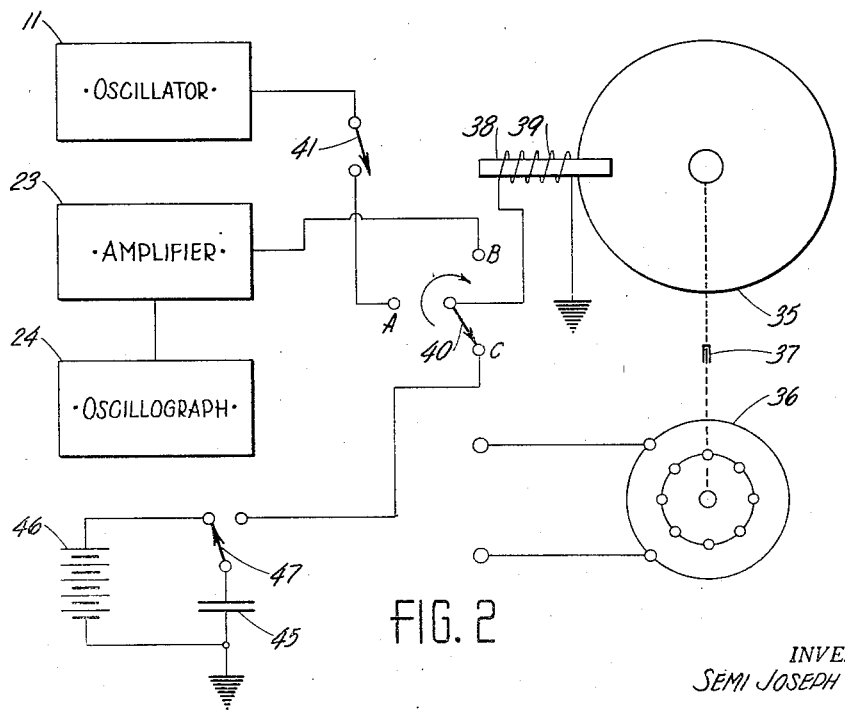

Figure 2 diagrammatically illustrates another device for practicing my invention.

I have provided a means and a method for accurately measuring short time intervals. Briefly the method is to provide a known and controlled frequency, and to record the frequency on some moving recording medium only during the interval to be timed. Subsequent reproduction of the record will disclose the number of cycles recorded during the time interval, and knowing the frequency with which the record was made, a person can determine the length of the time interval. In short, this process may be termed "cycle counting."

The accuracy of this system depends upon several factors, one of which is regularity of the frequency of the signal which is recorded. A crystal controlled oscillator may be used to provide this signal frequency, thereby assuring a signal supply the frequency of which is known to perhaps a millionth of one percent.

Another factor in the accuracy of my timer is the means for counting the cycles which were recorded. For some time intervals the record may be played back into an oscillograph and viewed by the observer. This is practical only when a comparatively few cycles of the known frequency have been recorded during the interval to be timed, and the accuracy with which the observer counts the cycles may be, for example, on the order of ¼ of a cycle. That is, the observer may be able to place the start of the signal within ⅛ of a cycle, and place the end of the signal within ⅛ of a cycle. Often the error arising from determining the beginning of the cyclic signal will entirely or partially cancel the error arising from determining the end of the cyclic signal. The worst possible condition will arise when the errors at the beginning and end of the signal are added together, thereby giving a large error. In the above example the error due to adding the error at the beginning to the error at the end would be ¼ of a cycle. If only 10 cycles of the signal had been recorded during the time interval there would be an error of one part in 40 or 2.5 percent. If, however, there had been 100 cycles of the signal recorded during the time interval, then there would be an error of 1 part in 400 or .25 percent. This illustrates that the accuracy of the timer will increase with an increase in the frequency of the signal to be recorded during the interval to be timed. It is also evident that the task of counting the cycles in an oscilloscope will be harder for a signal of a higher frequency.

Another factor in the accuracy of the timer is the trigger circuit. Some means must be provided for starting the recording process immediately upon the start of the interval to be timed, and stopping the recording immediately upon the end of the interval to be timed. Many suitable types of circuits capable of doing this may be devised. For instance, a pair of photo-electric cells may be used, one to start the recording and the other to stop the recording. Impedance alteration may be used. This will be more fully described in connection with Figure 1.

The accuracy of the system is independent of the constancy of movement of the medium during the recording process, and is independent of the constancy of movement of the medium during the reproducing process. Accordingly, if the recording medium is driven by an electric motor during the recording and reproducing process, the accuracy will not vary with variations in the speed of the motor. This may be very important because a great many synchronous motors exhibit a certain amount of "hunting" or speed variations which introduce error.

Figure 1 illustrates diagrammatically a timing device utilizing my invention and adapted to record the speed of a bullet 10. The device comprises an oscillator 11 which preferably is of the type which is accurately controlled and whose frequency is known. A trigger circuit comprising a balanced bridge circuit is provided, and the oscillator 11 is connected to it. The bridge circuit includes four impedances 12, 13, 14 and 15, and the output terminals are connected to the input of an amplifier 16. Output signal from the amplifier 16 is applied to a magnetic recording head 17 which is positioned adjacent a magnetic tape 18. The tape moves on rollers 19 and 20 in the direction of the arrow and is driven by a motor 21. A reproducing head 22 is provided adjacent the magnetic tape 18, and is connected to an amplifier 23 and an oscillograph or other indicating device 24.

With all four impedances 12, 13, 14, and 15 in the bridge circuit the bridge is balanced and there is no output to the amplifier. Accordingly, there is no signal recorded on the moving magnetic tape 18. When the bullet is fired so as to break or otherwise alter impedance 12, the bridge circuit becomes unbalanced and an alternating signal from the oscillator 11 appears at the output terminals. The signal is amplified and establishes in the recording head 17 an alternating magnetizing force which is recorded on the moving tape 18.

Shortly after altering the impedance 12 the bullet alters the impedance 13 thereby reestablishing a balanced condition in the bridge circuit and stopping the output. The recording process stops and there is a record on the tape 18 of the number of cycles of the oscillator during the interval of time that it took the bullet to pass from impedance 12 to impedance 13. Knowing the distance between the impedances 12 and 13, and knowing the frequency of the oscillator 11 the speed of the bullet can be determined accurately. In order to prevent a mixed record it is necessary that the time of one revolution of the tape 18 about the rollers 19, 20 be longer than the time it took the bullet to pass from impedance 12 to impedance 13, and suitable means may be provided to erase the record on the tape before it is used again.

In order to reproduce the signal which has been recorded on the tape 18, the tape is repeatedly driven past the reproducing head 22 thereby repeatedly setting up an electromotive force in the coil of the head which is substantially a facsimile of the magnetic pattern in the tape. The electromotive forces are amplified and actuate the oscilloscope 24. The operator can count the number of cycles appearing on the screen of the oscilloscope and thereby determine the length of time it took for the bullet to pass from impedance 12 to impedance 13.

It is apparent that mechanical or electronic means may be used to count the number of cycles recorded. For instance, if the frequency of the oscillator 11 is high in order to secure a higher degree of accuracy, there may be several hundred or even several thousand cycles of the signal which are recorded on the tape. Counting the cycles would be a long task and would be subject to human error. One method of electronic counting would be to connect the output of the amplifier 23 to a cascade of tubes arranged in pairs in such a manner that each tube of the first pair becomes operative only for every other cycle of the signal, and so that both tubes in the first pair are not operative for the same cycle. In other words, the first cycle causes only the first tube to fire, the second cycle causes only the second tube to fire and blocks the first tube, and the third cycle causes the first tube to fire and blocks the second tube, etc. Connected to the first pair of tubes is a second pair of tubes controlled by one of the tubes in the first pair. When the control tube of the first pair fires the first time, it fires the first tube of the second pair; and when the control tube fires the second time, it fires the second tube of the second pair. One of the two tubes of the second pair is a control tube which controls a third pair of tubes. The third pair of tubes includes a control tube which controls a fourth pair of tubes. The number of cycles in a certain time interval can be determined from the tubes which have been fired. Two tubes will count up to two cycles and no more. Three tubes will count up to three cycles. Four tubes will count up to five cycles. Five tubes will count up to seven cycles. Six tubes will count up to eleven cycles. Seven tubes will count up to fifteen cycles. Eight tubes will count up to 23 cycles. Ten tubes will count up to 47 cycles. Twelve tubes will count up to 95 cycles. Twenty tubes will count up to 1523 cycles etc. It is obvious that a cascade of tubes of this sort is extremely expensive and cannot be easily moved around to any spot in the country where an accurate timing of an event is desired. With my recording process, however, the medium upon which the record of the time interval has been recorded can easily be sent to the cascade of tubes and the time interval determined. Let us, for example, say that the Bureau of Standards has a cyle counter comprised of a cascade of a large number of tubes, and that a person in San Diego wishes to time the flight of a bullet. With my recording device he can make a magnetic pattern of the number of cycles of the oscillator during the interval of time it takes his bullet to alter two impedances at a known distance apart. The person can then take his tape 18 off of the rollers and send it to the Bureau of Standards. The Bureau does not even have to know at what speed the tape 18 was moving when the record was made. They can run the tape past a magnetic pick up head and determine on their cascade cycle counter the number of cycles which were recorded, and inform the person in San Diego. All that needs to be shipped is a few feet of light magnetic tape. When using this type of cycle counter care must be exercised that not more or less than the output from one revolution of the tape be applied to the input of the counter.

Figure 2 illustrates a form of my invention in which a rotating magnetic disc 35 is the record material upon which the cycles are recorded. The disc 35 is driven by a motor 36, and means 37 may be provided for removing the disc 35 from its shaft in order that another disc may be put on in its place. Adjacent the disc 35 and in flux linkage relationship with it is a pole piece 38 about which a coil 39 is wound. One end of the coil 39 is grounded and the other end is connected to a three-way switch having a recording position A, a reproducing position B and an obliterating position C.

For recording, the hand 40 is on position A of the switch and the oscillator 11 is connected to the coil 39 of the pole piece 38. A current signal from the oscillator may be amplified (as in Figure 1) and applied to the coil 39 to establish a magentic flux in the pole piece 38 which leaves a magnetic pattern on the disc 35. The switch 41 is symbolic of the trigger circuit and is first closed and then opened in accordance with the beginning and end of the interval to be timed.

For reproducing the record from the disc 35, the switch hand 40 is placed on position B. The pole piece 38 and the coil 39 then become a reproducing head and the record on the disc 35 establishes in the coil 39 on alternating electromotive force. This alternating signal is amplified in amplifier 23 and is applied to the oscillograph 24, or to a counting device such as the cascade of tubes which has been described.

When the cycles have been counted the record on the disc 35 is erased. This may be done by charging a condenser 45 by a battery 46. Switch 47 is then thrown and switch 40 is placed in position C. The condenser is then discharged to ground through the coil 39. The pole piece 38 and coil 39 thereby become an obliterating head. The value of obliterating by a condenser discharge is that an objectionable transient is not recorded on the magnetic material. The discharge time of the condenser should be large compared to the time of one revolution of the disc or tape, and the value of the charge on the condenser should be sufficient to saturate the magnetic material for at least one revolution of the material. When these two conditions are met the magnetic material will be saturated for at least one complete revolution, and during each successive revolution the charge on the condenser will be slightly less than during the preceding revolution, thereby bringing the magnetic material to a uniform state of remanence.

It is obvious that numerous changes can be made in my device. One such would be to cause a record of the oscillation of the oscillator to be recorded on a moving magnetic track except during the interval to be timed. Knowing the frequency of the oscillator, and knowing the time of one revolution of the magnetic track, the interval of time may be determined. This, of course, requires constant speed of the moving magnetic material, and accurate knowledge of the time of one complete revolution.

I claim as my invention:

1. A timing device comprising, in combination, a source of alternating signal of a known frequency, magnetic storage means, means for driving said storage means, magnetic recording means connected to said source of alternating signal and adapted to record a facsimile of said alternating signal upon said storage means only during the interval to be timed, and means for reproducing said recorded facsimile to determine the length of said time interval.

2. A timing device comprising, in combination, a source of alternating signal of a known frequency, a medium upon which said signal can be recorded, means for driving said medium, recording means connected to said source of alternating signal and adapted to record a number of cycles of said alternating signal upon said medium only during the interval to be timed, and means for reproducing said recorded number of cycles to determine the length of said time interval.

3. A timing device comprising, in combination, a source of alternating signal of a known frequency, a medium upon which said signal can be recorded, means for driving said medium, recording means connected to said source of signal and adapted to record a number of cycles of said signal on said medium, the number of cycles recorded depending upon the interval to be timed, reproducing means associated with said medium and adapted to reproduce the number of cycles recorded to indicate the length of the time interval.

4. The process of determining the duration of a time interval which comprises the steps of: providing a known and well-regulated frequency, recording a number of cycles of the known frequency on an endless medium during the interval to be timed, continuously reproducing a signal the number of cycles of which is dependent upon the number of cycles which were recorded, and counting the number of reproduced cycles.

5. A timing device comprising, in combination, signal storage means, means for driving the signal storage means, means for providing a known and well-regulated cyclic frequency, means for recording a signal corresponding to the cyclic frequency on said moving storage means during the interval to be timed, reproducing means for reproducing the recorded signal, and means connected to said reproducing means for giving an indication of the number of cycles of the well-regulated frequency which were effective to record a signal on the storage means.

6. A timing device comprising, in combination, signal storage means, means for driving the signal storage means, means for providing a known and well-regulated cyclic frequency, means for recording a signal corresponding to the cyclic frequency on said moving storage means during the interval to be timed, reproducing means for reproducing the recorded signal a plurality of times at regularly spaced short time intervals, and means connected to said reproducing means for giving an indication of the number of cycles of the well-regulated frequency which were effective to record a signal on the storage means.

7. A timing device comprising, in combination, a source of periodically alternating signal of a known frequency, endless magnetizable signal storage means, means for cylically rotating said magnetizable signal storage means, magnetic recording means connected to said source of periodically alternating signal and associated with said magnetizable signal storage means, means for controlling said periodically alternating signal in accordance with an interval to be timed whereby a number of cycles of said periodically alternating signal may be magnetically recorded on said magnetizable signal storage means, magnetic reproducing means associated with said magnetizable signal storage means for reproducing the recorded signal once during each of a plurality of cycles of rotation of said magnetizable signal storage means past said magnetic reproducing means, and means connected to said magnetic reproducing means whereby an indication is obtained of the number of cycles of the periodically alternating signal which were recorded on the said magnetizable signal storage means.

8. A timing device as set forth in claim 7 further characterized in this: that the cycles of the said periodically alternating signal are recorded on the said magnetizable signal storage means only during the interval to be timed.

9. A timing device as set forth in claim 7, further characterized in this: that the cycles of the interval-controlled periodically alternating signal are recorded on the said magnetizable signal storage means during only one revolution of the said magnetizable signal storage means.

10. A timing device as set forth in claim 7, further characterized in this: that the cycles of the said periodically alternating signal are recorded on the said magnetizable signal storage means only during the interval to be timed and during only one revolution of the said magnetizable signal storage means.

11. A timing device as set forth in claim 7, further characterized in this: that the said source of periodically alternating signal is a source of sinusoidally alternating signal.

12. A timing device as set forth in claim 7, further characterized in this: that the said means for controlling the periodically alternating signal in accordance with the interval to be timed is an impedance bridge adapted to be balanced and unbalanced in accordance with the beginning and end of the interval to be timed.

13. A timing device as set forth in claim 7, further characterized in this: that the said means for controlling the periodically alternating signal in accordance with the interval to be timed is a normally balanced impedance bridge which is unbalanced in accordance with the beginning of the interval to be timed and which is rebalanced in accordance with the end of the interval to be timed.

14. A timing device as set forth in claim 7, further characterized in this: that the said means for controlling the periodically alternating signal in accordance with the interval to be timed is a normally balanced impedance bridge which is unbalanced in accordance with the beginning of the interval to be timed to initiate the recording of the periodically alternating signal on the rotating magnetizable signal storage means, and which is rebalanced in accordance with the end of the interval to be timed to terminate the recording of the periodically alternating signal on the rotating magnetizable signal storage means.

15. A timing device as set forth in claim 7, further characterized in this: that the said means connected to the magnetic reproducing means for obtaining an indication of the number of cycles of the periodically alternating signal which were recorded on the magnetizable signal storage means is an oscilloscope means, whereby a visual indication is obtained.

16. A timing device as set forth in claim 7, further characterized in this: that the cycles of the said periodically alternating signal are sinusoidal and are recorded on the said magnetizable signal storage means only during the interval to be timed and during only one revolution of the said magnetizable signal storage means.

17. A timing device comprising in combination, a source of periodically alternating signal of a known frequency, impedance bridge means connected to said source and normally balanced whereby there is no signal output from said impedance bridge means, endless signal storage means, means for cylically rotating said signal storage means, recording means connected to the output of said impedance bridge means and associated with said signal storage means, means for unbalancing and balancing said impedance bridge in accordance, respectively, with the beginning and end of the interval to be timed whereby during the unbalanced period corresponding to the interval to be timed there is recorded on said signal storage means a plurality of periodic alternations of said signal, reproducing means associated with said signal storage means for reproducing the recorded signal once during each of a plurality of cycles or rotation of said storage means past said reproducing means, and means connected to said reproducing means whereby an indication is obtained of the number of cycles of the periodically alternating signal which were recorded on the said signal storage means during the said unbalanced period corresponding to the interval to be timed.

18. A timing device as set forth in claim 17 further characterized in this: that the cycles of the periodically alternating signal are recorded on the said signal storage means during only one revolution of the signal storage means.

19. A timing device as set forth in claim 17, further characterized in this: that the said source of periodically alternating signal is a source of sinusoidally alternating signal.

20. A timing device as set forth in claim 17, further characterized in this: that the said means connected to the reproducing means for obtaining an indication of the number of cycles of the periodically alternating signal which were recorded on the signal storage means is an oscilloscope means, whereby a visual indication is obtained.

21. A timing device as set forth in claim 17, further characterized in this: that the said source of periodically alternating signal is a source of sinusoidally alternating signal, and that the signal is recorded on the said signal storage means during only one revolution thereof.

22. A timing device comprising, in combination, a source of periodically alternating signal of a known frequency, endless signal storage means, means for cyclically rotating said signal storage means, recording means connected to said source of periodically alternating signal and associated with said signal storage means, means for controlling said periodically alternating signal in accordance with an interval to be timed whereby a number of cycles of said periodically alternating signal may be recorded on said signal storage means, reproducing means associated with said signal storage means for reproducing the recorded signal once during each of a plurality of cycles of rotation of said signal storage means past said reproducing means, and means connected to said reproducing means whereby an indication is obtained of the number of cycles of the periodically alternating signal which were recorded on said signal storage means.

23. A timing device as set forth in claim 22 further characterized in this: that the cycles of the said periodically alternating signal are recorded on the said signal storage means only during the interval to be timed.

24. A timing device as set forth in claim 22 further characterized in this: that the cycles of the periodically alternating signal are recorded on the said signal storage means during only one revolution of the said signal storage means.

25. A timing device as set forth in claim 22 further characterized in this: that the cycles of the said periodically alternating signal are recorded on the said signal storage means only during the interval to be timed and during only one revolution of the said signal storage means.

26. A timing device as set forth in claim 22 further characterized in this: that the said source of periodically alternating signal is a source of sinusoidally alternating signal.

27. A timing device as set forth in claim 22, further characterized in this: that the said means for controlling the periodically alternating signal in accordance with the interval to be timed is an impedance bridge adapted to be balanced and unbalanced in accordance with the beginning and end of the interval to be timed.

28. A timing device as set forth in claim 22, further characterized in this: that the said means for controlling the periodically alternating signal in accordance with the interval to be timed is a normally balanced impedance bridge which is unbalanced in accordance with the beginning of the interval to be timed and which is rebalanced in accordance with the end of the interval to be timed.

29. A timing device as set forth in claim 22, further characterized in this: that the said means for controlling the periodically alternating signal in accordance with the interval to be timed is a normally balanced impedance bridge which is unbalanced in accordance with the beginning of the interval to be timed to initiate the recording of the periodically alternating signal on the rotating signal storage means, and which is rebalanced in accordance with the end of the interval to be timed to terminate the recording of the periodically alternating signal on the rotating signal storage means.

30. A timing device as set forth in claim 22, further characterized in this: that the said means connected to the reproducing means for obtaining an indication of the number of cycles of the periodically alternating signal which were recorded on the signal storage means is an oscilloscope means, whereby a visual indication is obtained.

31. A timing device as set forth in claim 22, further characterized in this: that the cycles of the said periodically alternating signal are sinusoidal and are recorded on the said signal storage means only during the interval to be timed and during only one revolution of the said signal storage means.

32. The process of determining the duration of a time interval which comprises the steps of: providing a periodic source of an alternating signal whose frequency is known, providing an endless record medium, cyclically moving said record medium, controlling the alternating signal in accordance with the interval to be timed, recording on said moving record medium an alternating signal derived in accordance with the interval controlled alternating signal, reproducing the record from said record medium, and counting the number of cycles of said alternating signal which were recorded on the record medium.

33. The process as set forth in claim 32 further characterized by the step of completing the recording during only one cyclic motion of said record medium.

34. The process as set forth in claim 32 further characterized by the step of repeatedly cyclically moving said record medium while reproducing the record therefrom.

35. The process as set forth in claim 32 further characterized by the steps of completing the recording during only one cyclic motion of said record medium, and repeatedly cyclically moving said record medium while reproducing the record therefrom.

36. The process as set forth in claim 32 further characterized by the step of recording the signal on the record medium only during a time interval corresponding to the interval to be timed.

37. The process as set forth in claim 32 further characterized by the steps of recording the signal on the record medium only during a time interval corresponding to the interval to be timed, and completing the recording during only one cyclic motion of said record medium.

38. The process as set forth in claim 32, further characterized by the steps of recording the signal on the record medium only during a time interval corresponding to the interval to be timed, completing the recording during only one cyclic motion of said record medium, and repeatedly cyclically moving said record medium while reproducing the record therefrom.

39. The process as set forth in claim 32, further characterized by the steps of recording the signal on the record medium only during a time interval corresponding to the interval to be timed, completing the recording during only one cyclic motion of said record medium, repeatedly cyclically moving said record medium while reproducing the record therefrom, and controlling an oscilloscope in accordance with the repeatedly reproduced signal whereby the number of cycles of said signal which was recorded on the record medium is visible and may be counted.

SEMI JOSEPH BEGUN.